United States Patent
Jin et al.

(10) Patent No.: US 9,342,388 B1
(45) Date of Patent: May 17, 2016

(54) DYNAMIC QUEUE ALIAS

(71) Applicant: INTERNATIONAL BUSINESS MACHINES CORPORATION, Armonk, NY (US)

(72) Inventors: Qian Li Jin, Beijing (CN); Yan Shi, Beijing (CN); Fan Yang, Chong Qing (CN); Shan Yu, Beijing (CN); Yang Zhang, Beijing (CN)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 14/956,564

(22) Filed: Dec. 2, 2015

(51) Int. Cl.
G06F 3/00 (2006.01)
G06F 9/54 (2006.01)
G06F 12/08 (2016.01)

(52) U.S. Cl.
CPC ............. *G06F 9/546* (2013.01); *G06F 12/0802* (2013.01); *G06F 2212/6042* (2013.01)

(58) Field of Classification Search
CPC ....................................................... G06F 9/546
USPC ........................................................ 719/314
See application file for complete search history.

(56) References Cited

U.S. PATENT DOCUMENTS 5,732,243 A * 3/1998 McMahan ............. G06F 9/3806 711/137
2003/0112818 A1* 6/2003 Schmidt .................. H04L 49/30 370/414
2014/0108662 A1 4/2014 Anaya et al.
2015/0012483 A1 1/2015 Zheng et al.
2015/0058281 A1 2/2015 Bourbonnais et al.

OTHER PUBLICATIONS

Ying-Lin Chen, The performance of a client-side web caching system, Apr. 2000.*
Jabali, Marcelo, "The Message: Virtual and Composite Destinations with Apache ActiveMQ", Marcelojabli.blogspot.hk, Nov. 30, 2011, Printed on: Aug. 6, 2015, 5 pages, <http://marcelojabali.blogspot.hk/2011/11/virtual-and-composite-destinations-with.html>.
Overby, Lin, "Enabling Continuous Availability with IBM Multi-site Workload Lifeline", IBM Systems—Enterprise Networking Solutions, Share session 17086, © 2015 IBM Corporation, pp. 1-42.
"Apache ActiveMQ—Virtual Destination", The Apache Software Foundation, © 2004-2011, The Apache Software Foundation, 3 pages, <http://activemq.apache.org/virtual-destinations.html>.

(Continued)

*Primary Examiner* — Lechi Truong
(74) *Attorney, Agent, or Firm* — Brian M. Restauro

(57) ABSTRACT

Embodiments of the present invention provide methods, program products, and systems to increase efficiency in message oriented middleware. Embodiments of the present invention can, responsive to receiving from an application an open request for a queue alias of a queue manager, provide to the application target cache information which includes a target name and a change flag count associated with the queue alias. Embodiments of the present invention can, responsive to receiving a message from the application that includes respective target cache information including a target name and a change flag count, determine a target location, wherein if the change flag count of the received message matches a current change flag count of the queue alias, the determined target location is a target location associated with the received target name.

14 Claims, 5 Drawing Sheets

(56) References Cited

OTHER PUBLICATIONS

"AMQ8xxx: Administration", IBM Knowledge Center, WebSphere MQ 8.0.0, Printed on: Aug. 6, 2015, pp. 1-159. <01.ibm.com/support/knowledgecenter/api/content/nl/en-us/SSFKSJ_8.0.0/com.ibm.mq.ref.doc/amq8.htm>.

"Cluster components", IBM Knowledge Center, IBM MQ, Version 8.0, Last updated: Wednesday, Jun. 24, 2015, 2 pages, <01.ibm.com/support/knowledgecenter/api/content/nl/en-us/SSFKSJ_8.0.0/com.ibm.mq.pro.doc/q017190_.htm>.

"CLWLRANK queue attribute", IBM Knowledge Center, IBM MQ, Version 8.0, Last updated: Wednesday, Jun. 24, 2015, 1 page, 01.ibm.com/support/knowledgecenter/api/content/nl/en-us/SSFKSJ_8.0.0/com.ibm.mq.ref.con.doc/q082410_.htm>.

"Apache Kafka" Kafka 0.8.2 Documentation, Apache Kafka, Printed on: Aug. 6, 2015, pp. 1-78, <http://kafka.apache.org/documentation.html#design>.

"MSMQDestination", Microsoft, © 2015, Introduced in MSMQ 3.0, Printed on: Aug. 6, 2015, pp. 1-2, <https://msdn.microsoft.com/en-us/library/ms706239(d=printer,v=vs.85)29.aspx>.

"MSMQDestination.Open", Microsoft, © 2015, Introduced in MSMQ 3.0, Printed on: Aug. 6, 2015, pp. 1-2, <https://msdn.microsoft.com/en-us/library/ms705148(d=printer,v=vs.85).aspx>.

"MSMQDestination.PathName", Microsoft, © 2015, Microsoft, Printed on: Aug. 6, 2015, pp. 1-2, <https://msdn.microsoft.com/en-us/library/ms704072(d=printer,v=vs.85).aspx>.

"Oracle® Tuxedo Message Queue (OTMQ)", Programming Guide, 12c Release 1 (12.1.1), Jun. 2012, © 2012 Oracle and/or its affiliates, pp. i-36.

"Publish/subscribe messaging", IBM MQ, Version 8.0, Last updated: Wednesday, Jun. 24, 2015, pp. 1-2, <http://www-01.ibm.com/support/knowledgecenter/api/content/nl/en-us/SSFKSJ_8.0.0/com.ibm.mq.pro.doc/q004870_.htm>.

* cited by examiner

DYNAMIC QUEUE ALIAS

BACKGROUND

The present invention relates generally to the field of messaging middleware, and more particularly to dynamic queue alias for messaging middleware.

Message oriented middleware (MOM) is a combination of software and/or hardware infrastructure that facilitates the sending and receiving of messages between distributed systems. Distributed systems (e.g., Active-Active data centers) refer to two or more data centers which are independent, separated geographically, and have the capability to process business transactions and provide the same sets of business services. In one example, message oriented middleware can be used to send business transaction requests from front-end systems (e.g., banking channels) to backend core business systems.

Master data residing on two data centers can be replicated to each other to ensure consistency. In planned (e.g., due to maintenance) or unplanned outages (e.g., due to system failure), business transactions can be switched from one site to another (i.e., via a process referred to as site switching).

SUMMARY

Embodiments of the present invention provide methods, program products, and systems to increase efficiency in message oriented middleware. In one embodiment of the present invention, a method is provided comprising: responsive to receiving from an application an open request for a queue alias of a queue manager, providing to the application target cache information associated with the queue alias, wherein the target cache information includes a target name and a change flag count; and responsive to receiving a message from the application that includes respective target cache information including a target name and a change flag count, determining a target location, wherein if the change flag count of the received message matches a current change flag count of the queue alias, the determined target location is a target location associated with the received target name.

DETAILED DESCRIPTION

Embodiments of the present invention recognize inefficiencies in messaging oriented middleware. For example, where queue manager clusters are used, no isolation between the distributed systems exists, which can lead to increased security risks and can subject the systems to longer recovery time during unplanned outages. In another instance, where a publisher/subscriber system is used, embodiments of the present invention recognize that data centers may receive duplicate transaction messages and that data centers may not receive messages due to time gaps in site switching. In yet other instances, where a queue alias is used, targets of the queue alias cannot be effectively altered when messages are being inputted. Normal alterations to the target are not allowed if the queue alias is opened by any application. Thus, the application must close the queue alias and reopen it. Embodiments of the present invention provide solutions to increase efficiency in message oriented middleware. In this manner, as discussed in greater detail in this specification, embodiments of the present invention can provide a dynamic queue alias that enables isolation between two data centers while allowing for dynamic routing, flexible switching, and concurrent applications to be used without having to close the queue alias.

Figure 1:
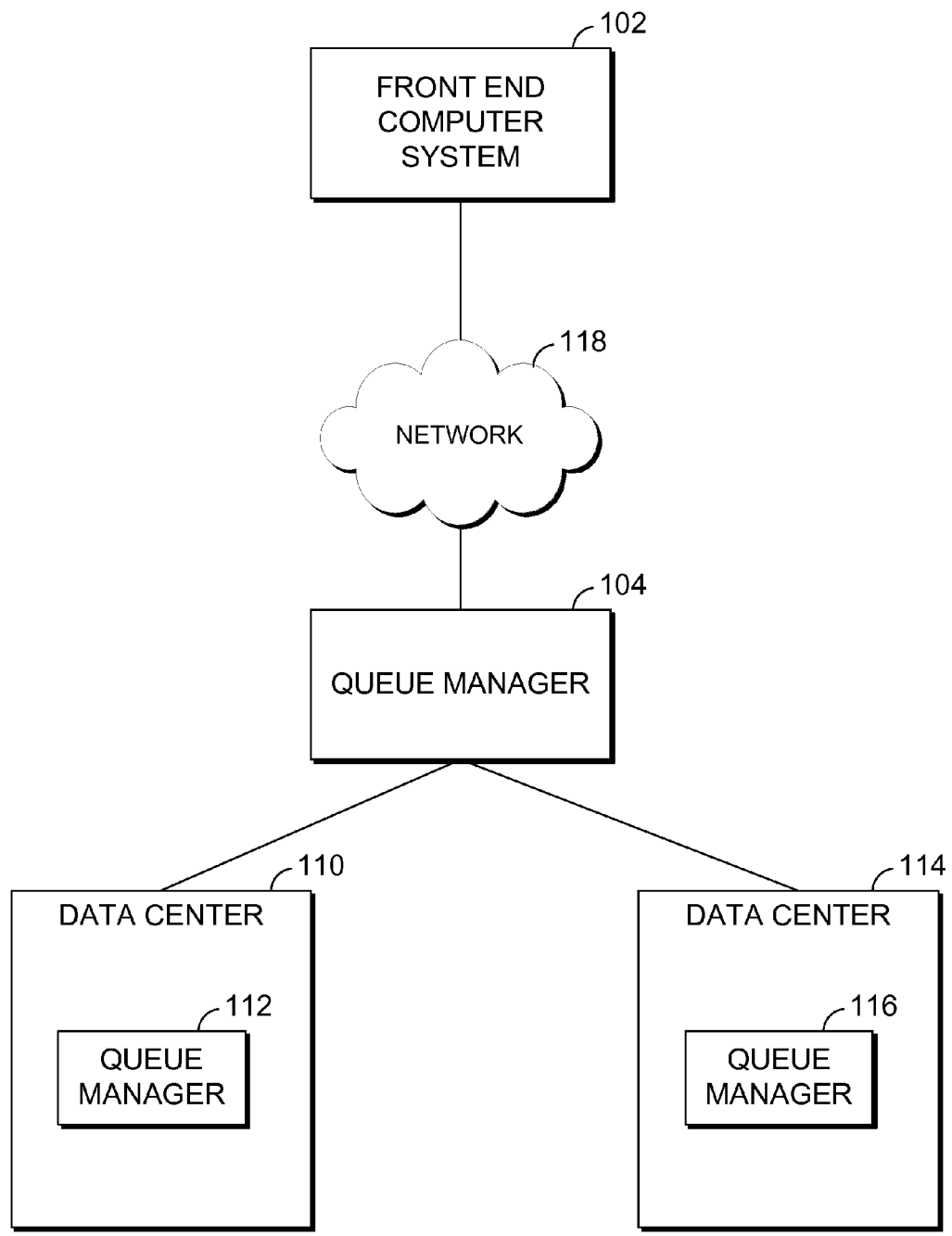
FIG. 1 is a block diagram of a computing environment, in accordance with an embodiment of the present invention.

FIG. 1 is a functional block diagram of computing environment 100, in accordance with an embodiment of the present invention. Computing environment 100 includes front end computer system 102, queue manager 104, and data centers 110 and 114. Front end computer system 102, queue manager 104, and data centers 110 and 114 can be desktop computers, laptop computers, specialized computer servers, or any other computer systems known in the art. In certain embodiments, front end computer system 102, queue manager 104, and data centers 110 and 114 represent computer systems utilizing clustered computers and components to act as a single pool of seamless resources when accessed through network 118. For example, such embodiments may be used in data center, cloud computing, storage area network (SAN), and network attached storage (NAS) applications. In certain embodiments, front end computer system 102, queue manager 104, and data centers 110 and 114 represent virtual machines. In general, front end computer system 102, queue manager 104, and data centers 110 and 114 are representative of any electronic devices, or combination of electronic devices, capable of executing machine-readable program instructions, as described in greater detail with regard to FIG. 6.

Front end computer system 102 includes one or more applications (not shown) that are capable of interfacing with queue manager 104 to send messages to data centers 110 and 114. In general, front end computer system 102 can be implemented by any information system that is directly accessed and interacted with by a user to receive or utilize back end capabilities of data centers 110 and 114. For example, front end computer system 102 can be an applications server with applications running to process online banking business. Applications of front end computer system 102 (not shown) can connect to a queue manager (e.g., queue manager 104) to send messages which represent the requests of online banking transactions.

In this embodiment, an application of front end computer system 102 receives target cache information from queue manager 104 prior to the application sending a message to queue manager 104. The term "target cache", as used herein, refers to generated dynamic target details associated with the queue alias. For example, in this embodiment, the target cache can include a TargetName and a ChangeFlag value. A "TargetName", as used herein, refers to an intended destination of a received message that is resolved by a queue alias. A "ChangeFlag value", as used herein, refers to a count of changes to the TargetName of the dynamic queue alias. Where subsequent messages are sent by the application, the application of front end computer system 102 relies on the copied target cache information.

Queue manager 104 facilitates communications between front end computer system 102 and data centers 110 and 114. For example, queue manager 104 provides queueing services to the one or more applications (e.g., message queuing interface) of front end computer system 102 calls, and commands to create, modify, display and delete messages. Queue manager 104 includes input/output module 106 and determination module 108 (shown in FIG. 2) and will be discussed in greater detail with regard to FIG. 2.

In this embodiment, queue manager 104 manages a queue alias. A "queue alias", as used herein, refers to an alias which references a queue as a target. A "target", in this embodiment, is a queue of data center 110 or data center 114 or a combination of the two data centers. For example, before sending a message, an application of front end computer system 102 can open the queue alias and resolve the target (i.e., determine where the message will be sent) defined in the queue alias. In other words, queue manager 104 stores the queue alias which can then be used to determine a corresponding target of a received message, defined within the queue alias.

Queue manager 104 generates a target cache and uses the target cache to enable dynamic routing of messages (i.e., switching a message's intended destination without closing and reopening the queue alias). In this embodiment, queue manager 104 generates a target cache for each queue alias as soon as queue manager 104 starts running, before receiving any messages. For example, prior to receiving a message from an application of front end computer system 102, when queue manager 104 starts up, it can generate a target cache comprising a ChangeFlag value of "0" and can increment the ChangeFlag value by a value of "1" responsive to detecting changes to the TargetName of the dynamic queue alias later.

In this embodiment, queue manager 104 uses the target cache to enable the dynamic routing of messages by comparing target cache information residing on queue manager 104 with target cache information residing on an application of front end computer system 102. For example, responsive to determining that the ChangeFlag value residing on queue manager 104 differs from the ChangeFlag value of an application of front end computer system 102, queue manager 104 can update the application's target cache information and alter the target, as discussed in greater detail with regards to FIGS. 3 and 4.

Data centers 110 and 114 are computer systems that are capable of performing back end processing for front end computer system 102. Data centers 110 and 114 include respective queue managers 112 and 116. Queue managers 112 and 116 communicate with queue manager 104 to receive messages from front end computer system 102. In this embodiment, data centers 110 and 114 can include active-active data center solutions (not shown) that can invoke command interface exposed by queue manager 104 to alter the queue alias of queue manager 104. In other words, data centers 110 and 114 include active-active-data center solutions that can alert queue manager 104 that a data center has become unavailable and to change intended targets from the unavailable data center to the available data center.

In some instances, data centers 110 and 114 can become unavailable. In this embodiment, data centers 110 and 114 can become unavailable due to a planned or unexpected system failure. A "failure", as used herein, can be any abnormal termination, interruption, or error in software and/or hardware in data centers 110 and 114 or any other components of computing environment 100 that affects access to one or more of data centers 110 and 114. Where a data center becomes unavailable, an Active-Active Data center's solution (not shown) performs a site-switching process (i.e., alters targets of the queue alias). For example, data center 110 can become available and the Active-Active data center's solution can perform a site switch that will alter the queue alias of queue manager 104 (e.g., send messages originally intended for data center 110 to data center 114).

Network 118 can be, for example, a local area network (LAN), a wide area network (WAN) such as the Internet, or a combination of the two, and include wired, wireless, or fiber optic connections. In general, network 118 can be any combination of connections and protocols that will support communications between front end computer system 102, queue manager 104, and data centers 110 and 114, in accordance with a desired embodiment of the invention.

Figure 2:
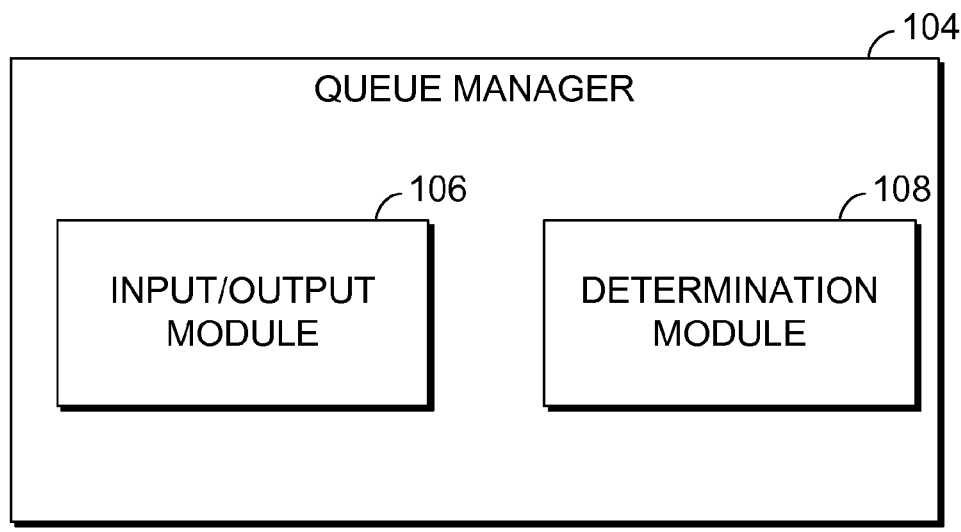
FIG. 2 is a block diagram showing machine logic (for example, software) portion of an embodiment of the present invention.

FIG. 2 is a block diagram showing machine logic (for example, software) portion of an embodiment of the present invention.

Queue manager 104 includes input/output module 106 and determination module 108. Input/output module 106 receives one or more messages from front end computer system 102. In general, input/output module 106 can receive one or more messages from one or more other components of computing environment 100.

Determination module 108 is responsible for introducing target cache information such as TargetName and incrementing the ChangeFlag. In this embodiment, determination module 108 introduces target cache information to one or more applications of front end computer system 102. For example, an application of front end computer system 102 can issue an open request for a queue alias residing on queue manager 104. Responsive to receiving the open request for the queue alias, determination module 108 can provide the application with the target cache information associated with the queue alias. In other words, determination module 108 provides the application of front end computer system 102 the TargetName and ChangeFlag values.

Determination module 108 also compares target cache information residing on queue manger 104 with target cache information residing on an application of front end computer system 102. For example, responsive to determining that the ChangeFlag value residing on queue manager 104 differs from the ChangeFlag value of an application of front end computer system 102, determination module 108 updates the application's target cache information by transmitting an indication that the ChangeFlag values are not equal. In this embodiment, the indication can contain an updated TargetName (e.g., a switch from data center 110 to data center 114) and an updated ChangeFlag value (e.g., a change from "0" to "1"). Accordingly, the application copies the updated TargetName and Change Flag value to its own Target Cache.

Figure 3:
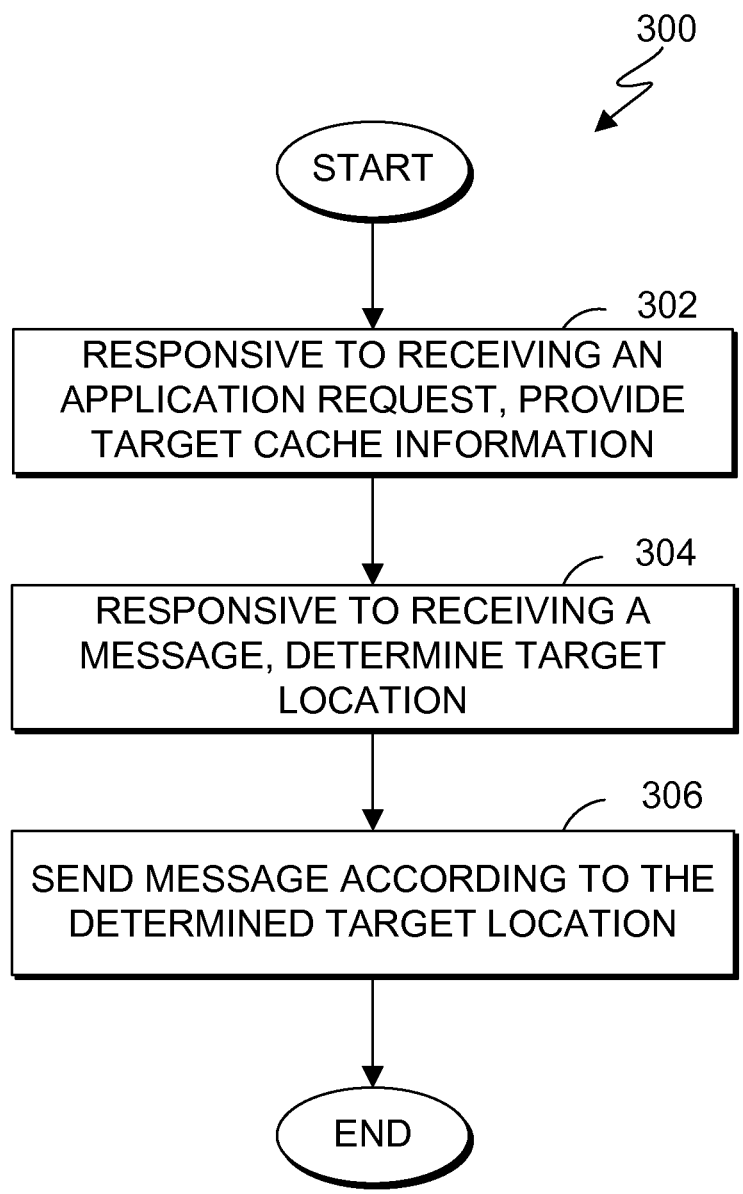
FIG. 3 is a flowchart illustrating operational steps for sending messages, in accordance with an embodiment of the present invention.

FIG. 3 is a flowchart illustrating operational steps for sending messages, in accordance with an embodiment of the present invention.

In step 302, responsive to receiving an application request, queue manager 104 provides target cache information to an application making the request. As previously discussed, the term "target cache", as used herein, refers to generated dynamic target details associated with the queue alias. For example, in this embodiment, the target cache can include a TargetName and a ChangeFlag value. A "TargetName", as used herein, refers to an intended destination of a received message that is resolved by a queue alias. A "ChangeFlag value", as used herein, refers to a count of changes to the TargetName of the dynamic queue alias.

In this embodiment, queue manager 104 provides target cache information to an application making the request by allowing the application access to the queue alias. Accordingly, an application of front end computer system 102 can replicate the TargetName (e.g., a queue in data center 110) and ChangeFlag value of the queue alias to the application's own memory and send the message to queue manager 104. Responsive to receiving the open request, queue manager 104 can provide the target cache information. Accordingly, the application can replicate the TargetName (e.g., a queue in data center 110, Q2) and ChangeFlag (e.g., "0" because no change to the TargetName have occurred) values to its own memory and transmit the message to queue manager 104.

In step 304, responsive to receiving a message, determination module 108 determines a target location. In this embodiment, determination module 108 determines a target location by reading the ChangeFlag field of the received message and comparing the ChangeFlag field of the received message to its local ChangeFlag Field. Based on the comparison, queue manager 104 can either send the message according to the TargetName of the received message or update the target cache information of the application, as discussed in greater detail with regard to FIG. 4. In this embodiment, the message can be associated with the previously received application request or can be unrelated.

Where an application has copied the target cache information of queue manager 104 prior to sending a first message, the values of the target cache information will not differ if no change to the TargetName has occurred prior to sending the first message. In subsequent instances, the TargetName residing on queue manager 104 may change (e.g., due to a data center becoming unavailable) and thus, no longer be in sync with the target cache information residing on an application of front end computer system 102. Where the target cache information differs (i.e., where the ChangeFlag values differ), determination module 108 can determine the target location and update the application as discussed in greater detail with regard to FIG. 4.

In step 306, queue manager 104 send the message according to the determined target location. In this embodiment, queue manager 104 can send the message to queue manager 112 or queue manager 116 of data center 110 and data center 114, respectively or to both queue managers 112 and 116.

Figure 4:
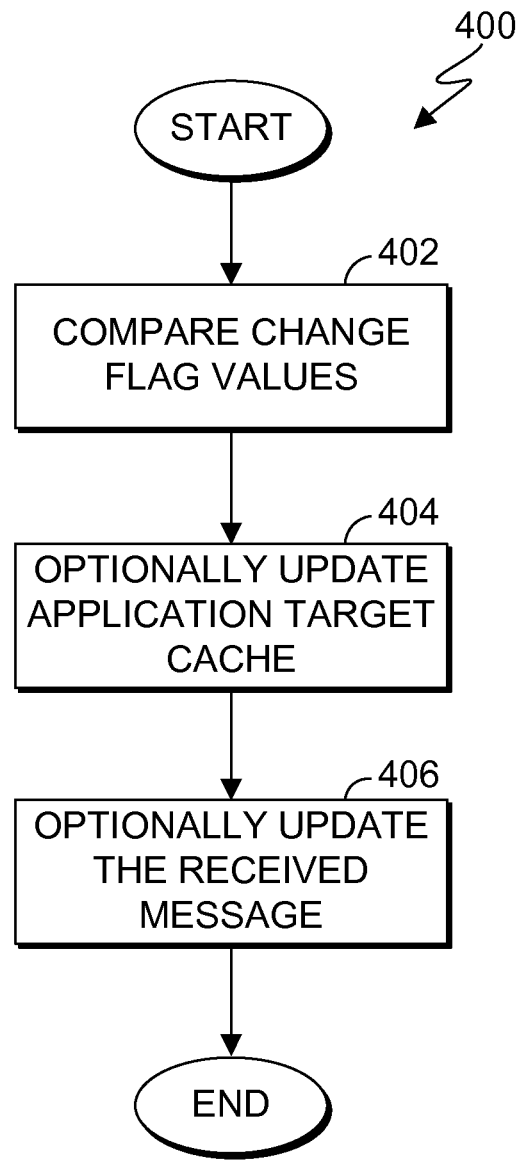
FIG. 4 is a flowchart illustrating operational steps for determining target locations, in accordance with an embodiment of the present invention.

FIG. 4 is a flowchart 400 illustrating operational steps for determining target locations, in accordance with an embodiment of the present invention. For example, the operational steps of flowchart 400 can be performed at step 304 of flowchart 300. For illustrative purposes, the following discussion is made with respect to an application of front end computer system 102 sending a message to a queue manager that has received an indication that one of the data centers has gone offline.

In step 402, determination module 108 compares ChangeFlag values. In this embodiment, determination module 108 compares the ChangeFlag field of the received message to its local ChangeFlag Field. For example, determination module 108 can have a ChangeFlag value of "0". Determination module 108 can read the ChangeFlag field of a received message, message $M_1$, and determine that the ChangeFlag field for message $M_1$ is "0". Determination module 108 can compare the two ChangeFlag fields and determine whether the ChangeFlag values are the same.

In this embodiment, the ChangeFlag fields can have different values when an intended target (e.g., either data center 110 or 114) goes offline and an active-site switch is performed (i.e., when the intended message is routed to an alternate destination). Where an intended target goes offline and an active-site switch is performed, an active-active data center solution alters the target of the queue alias of queue manager 104 to point to a queue in the other data center that is not offline. For example, where the intended target is data center 110, an active-active data center solution can alter the target of the queue alias of queue manager 104 to point to a queue in data center 114. Determination module 108 then updates its local TargetName to reflect the latest target (e.g., data center 114) and increments its local ChangeFlag value (e.g., from "0" to "1"). In other words, the intended target is effectively "switched" from data center 110 to data center 114. Thus, future messages to be sent to data center 110 will be effectively sent to data center 114.

Where a previously unavailable data center becomes available, the active-active data center solution for the previously offline data center can update queue manager 104 to switch the workload back to the now available data center. For example, where data center 110 was previously unavailable and becomes available, an active-active data center solution can either remotely or locally call the command interface exposed by queue manager 104 to alter the queue alias of queue manager 104 to allow queue manger 104 to start sending data center 110 messages.

In instances where determination module 108 compares the ChangeFlag values and determines they are equal, determination module 108 sends the message according to the intended target destination as indicated by the TargetName of the received message.

In step 404, determination module 108 optionally updates the target cache of the application of front end computer system 102. In this embodiment, determination module 108 updates the application target cache responsive to determining that the ChangeFlag values of the received message and its own ChangeFlag values are not equal.

For example, determination module 108 can determine that application's target cache differs from its respective target cache by identifying that the received message's ChangeFlag value is "0" (as copied from the application's target cache) and its own ChangeFlag value is "1" determination module 108 updates the application's target cache. Responsive to determining that the ChangeFlag values are not equal, determination module 108 can transmit an indication that the ChangeFlag values are not equal. In this embodiment, the indication can contain an updated TargetName (e.g., a switch from data center 110 to data center 114) and an updated ChangeFlag value (e.g., a change from "0" to "1"). Accordingly, the application copies the updated TargetName and Change Flag value to its own Target Cache. In other words, the application of front end computer system 102 synchs TargetName and ChangeFlag values with the target cache residing on queue manager 104.

In step 406, determination module 108 optionally updates the TargetName and ChangeFlag associated with the message. In this embodiment determination module 108 updates the TargetName and ChangeFlag values of the message by replicating the target cache information of determination module 108 to the TargetName and ChangeFlag fields of the message. Accordingly, determination module 108 can send the message to its intended destination in a manner described in step 306 of flowchart 300.

Figure 5:
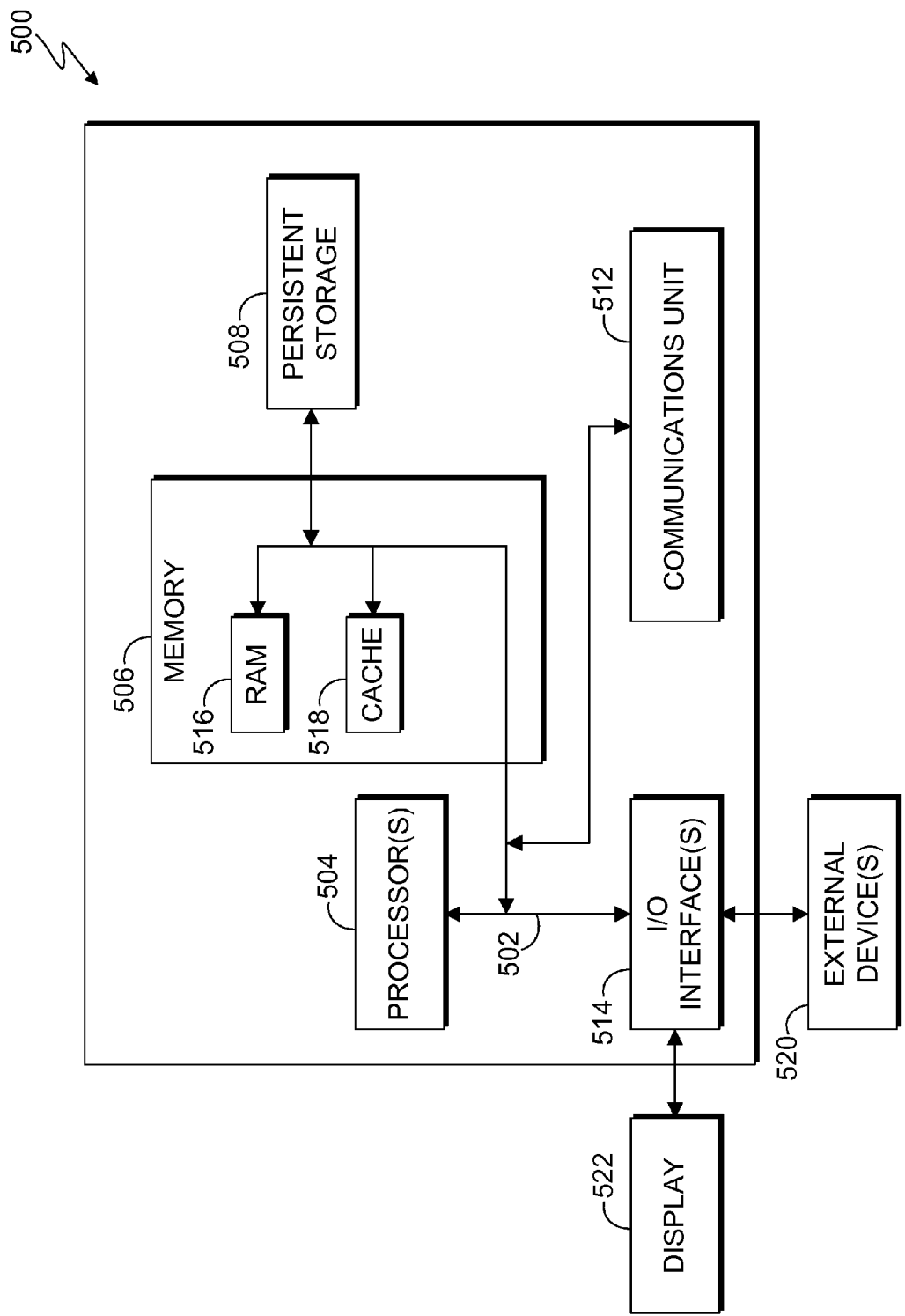
FIG. 5 is a block diagram of internal and external components of the computer systems of FIG. 1, in accordance with an embodiment of the present invention.

FIG. 5 is a block diagram of internal and external components of a computer system 500, which is representative the computer systems of FIG. 1, in accordance with an embodiment of the present invention. It should be appreciated that FIG. 5 provides only an illustration of one implementation and does not imply any limitations with regard to the environments in which different embodiments may be implemented. In general, the components illustrated in FIG. 5 are representative of any electronic device capable of executing machine-readable program instructions. Examples of computer systems, environments, and/or configurations that may be represented by the components illustrated in FIG. 5 include, but are not limited to, personal computer systems, server computer systems, thin clients, thick clients, laptop computer systems, tablet computer systems, cellular telephones (e.g., smart phones), multiprocessor systems, microprocessor-based systems, network PCs, minicomputer systems, mainframe computer systems, and distributed cloud computing environments that include any of the above systems or devices.

Computer system 500 includes communications fabric 502, which provides for communications between one or more processors 504, memory 506, persistent storage 508, communications unit 512, and one or more input/output (I/O) interfaces 514. Communications fabric 502 can be implemented with any architecture designed for passing data and/or control information between processors (such as microprocessors, communications and network processors, etc.), system memory, peripheral devices, and any other hardware components within a system. For example, communications fabric 502 can be implemented with one or more buses.

Memory 506 and persistent storage 508 are computer-readable storage media. In this embodiment, memory 506 includes random access memory (RAM) 516 and cache memory 518. In general, memory 506 can include any suitable volatile or non-volatile computer-readable storage media. Software is stored in persistent storage 508 for execution and/or access by one or more of the respective processors 504 via one or more memories of memory 506.

Persistent storage 508 may include, for example, a plurality of magnetic hard disk drives. Alternatively, or in addition to magnetic hard disk drives, persistent storage 508 can include one or more solid state hard drives, semiconductor storage devices, read-only memories (ROM), erasable programmable read-only memories (EPROM), flash memories, or any other computer-readable storage media that is capable of storing program instructions or digital information.

The media used by persistent storage 508 can also be removable. For example, a removable hard drive can be used for persistent storage 508. Other examples include optical and magnetic disks, thumb drives, and smart cards that are inserted into a drive for transfer onto another computer-readable storage medium that is also part of persistent storage 508.

Communications unit 512 provides for communications with other computer systems or devices via a network (e.g., network 118). In this exemplary embodiment, communications unit 512 includes network adapters or interfaces such as a TCP/IP adapter cards, wireless Wi-Fi interface cards, or 3G or 4G wireless interface cards or other wired or wireless communication links. The network can comprise, for example, copper wires, optical fibers, wireless transmission, routers, firewalls, switches, gateway computers and/or edge servers. Software and data used to practice embodiments of the present invention can be downloaded to front end computer system 102 through communications unit 512 (e.g., via the Internet, a local area network or other wide area network). From communications unit 512, the software and data can be loaded onto persistent storage 508.

One or more I/O interfaces 514 allow for input and output of data with other devices that may be connected to computer system 500. For example, I/O interface 514 can provide a connection to one or more external devices 520 such as a keyboard, computer mouse, touch screen, virtual keyboard, touch pad, pointing device, or other human interface devices. External devices 520 can also include portable computer-readable storage media such as, for example, thumb drives, portable optical or magnetic disks, and memory cards. I/O interface 514 also connects to display 522.

Display 522 provides a mechanism to display data to a user and can be, for example, a computer monitor. Display 522 can also be an incorporated display and may function as a touch screen, such as a built-in display of a tablet computer.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

The descriptions of the various embodiments of the present invention have been presented for purposes of illustration, but are not intended to be exhaustive or limited to the embodiments disclosed. Many modifications and variations will be apparent to those of ordinary skill in the art without departing from the scope and spirit of the invention. The terminology used herein was chosen to best explain the principles of the embodiment, the practical application or technical improvement over technologies found in the marketplace, or to enable others of ordinary skill in the art to understand the embodiments disclosed herein.

What is claimed is:

1. A method comprising:
responsive to receiving from an application an open request for a queue alias of a queue manager, providing to the application, by one or more computer processors, target cache information associated with the queue alias, wherein the target cache information includes a target name and a change flag count;
responsive to receiving a message from the application that includes respective target cache information including a target name and a change flag count, determining, by one or more computer processors, a target location, wherein if the change flag count of the received message matches a current change flag count of the queue alias, the determined target location is a target location associated with the received target name, and wherein determining the target location comprises:
comparing change flag counts associated with the queue alias and the received message, and
identifying that the change flag counts associated with the queue alias and the received message are not equal; and
responsive to identifying that the change flag counts associated with the queue alias and the received message are not equal, updating, by one or more computer processors, target cache information of the application and the message.

2. The method of claim 1, further comprising:
sending, by one or more computer processors, the received message according to the determined target location.

3. The method of claim 1, further comprising:
responsive to an altering of the target of the queue alias, updating the target cache information associated with the queue alias, wherein updating the target cache information includes updating the change flag value.

4. The method of claim 1, further comprising:
transmitting, by one or more computer processors, an indication that the change flag counts are not equal to the application.

5. The method of claim 1, further comprising:
responsive to updating the message, sending, by one or more computer processors, the updated message.

6. A computer program product comprising:
one or more computer readable storage media and program instructions stored on the one or more computer readable storage media, the program instructions comprising:
program instructions to, responsive to receiving from an application an open request for a queue alias of a queue manager, provide to the application target cache information associated with the queue alias, wherein the target cache information includes a target name and a change flag count;
program instructions to, responsive to receiving a message from the application that includes respective target cache information including a target name and a change flag count, determine a target location, wherein if the change flag count of the received message matches a current change flag count of the queue alias, the determined target location is a target location associated with the received target name, and wherein the program instructions to determine the target location comprise:

program instructions to compare change flag counts associated with the queue alias and the received message, and program instructions to identify that the change flag counts associated with the queue alias and the received message are not equal; and program instructions to, responsive to identifying that the change flag counts associated with the queue alias and the received message are not equal, update target cache information of the application and the message.

7. The computer program product of claim 6, wherein the program instructions stored on the one or more computer readable storage media further comprise:

program instructions to send the received message according to the determined target location.

8. The computer program product of claim 6, wherein the program instructions stored on the one or more computer readable storage media further comprise:

program instructions to, responsive to an altering of the target of the queue alias, update the target cache information associated with the queue alias, wherein updating the target cache information includes updating the change flag value.

9. The computer program product of claim 6, wherein the program instructions stored on the one or more computer readable storage media further comprise:

program instructions to transmit an indication that the change flag counts are not equal to the application.

10. The computer program product of claim 6, wherein the program instructions stored on the one or more computer readable storage media further comprise:

program instructions to, responsive to updating the message, send the updated message.

11. A computer system comprising:

one or more computer processors;

one or more computer readable storage media; and program instructions stored on the one or more computer readable storage media for execution by at least one of the one or more computer processors, the program instructions comprising:

program instructions to, responsive to receiving from an application an open request for a queue alias of a queue manager, provide to the application target cache information associated with the queue alias, wherein the target cache information includes a target name and a change flag count;

program instructions to, responsive to receiving a message from the application that includes respective target cache information including a target name and a change flag count, determine a target location, wherein if the change flag count of the received message matches a current change flag count of the queue alias, the determined target location is a target location associated with the received target name, and wherein the program instructions to determine the target location comprise:

program instructions to compare change flag counts associated with the queue alias and the received message, and program instructions to identify that the change flag counts associated with the queue alias and the received message are not equal; and program instructions to, responsive to identifying that the change flag counts associated with the queue alias and the received message are not equal, update target cache information of the application and the message.

12. The computer system of claim 11, wherein the program instructions stored on the one or more computer readable storage media further comprise:

program instructions to send the received message according to the determined target location.

13. The computer system of claim 11, wherein the program instructions stored on the one or more computer readable storage media further comprise:

program instructions to, responsive to an altering of the target of the queue alias, update the target cache information associated with the queue alias, wherein updating the target cache information includes updating the change flag value.

14. The computer system of claim 11, wherein the program instructions stored on the one or more computer readable storage media further comprise:

program instructions to transmit an indication that the change flag counts are not equal to the application.

\* \* \* \* \*